(12) United States Patent
Baney

(10) Patent No.: US 6,188,810 B1
(45) Date of Patent: Feb. 13, 2001

(54) REVERSIBLE RING COUPLER FOR OPTICAL NETWORKS

(75) Inventor: Douglas M. Baney, Los Altos, CA (US)

(73) Assignee: Agilent Technologies, Inc., Palo Alto, CA (US)

( * ) Notice: Under 35 U.S.C. 154(b), the term of this patent shall be extended for 0 days.

(21) Appl. No.: 09/262,128

(22) Filed: Mar. 3, 1999

(51) Int. Cl.$^7$ ...................................................... G02B 5/30
(52) U.S. Cl. ................................................ 385/11; 385/15
(58) Field of Search ................... 385/1–11, 15, 385/16

(56) References Cited

U.S. PATENT DOCUMENTS 5,982,539 * 11/1999 Shidasaki .

6,088,491 * 7/2000 Sorin et al. ............................ 385/11

* cited by examiner

*Primary Examiner*—Robert Kim

(57) ABSTRACT

A reversible optical circulator and a coupling device constructed therefrom. The optical circulator includes first and second non-reciprocal optical elements having magnetic field generators for generating magnetic fields that determine the rotation of the polarization vector of light signals passing therethrough. The non-reciprocal optical elements rotate the polarization of the light signals by either 90 degrees or 0 degrees depending on the direction of the magnetic field associated with that non-reciprocal element. The reversible circulator can be combined with wavelength selective reflectors to form a light coupling device that adds a first light signal having a wavelength of $\lambda_1$ to a second light signal of wavelength $\lambda_2$ traveling in an optical channel. The direction of the added light signal in the optical channel is controlled by the direction of the magnetic field in the optical circulator and the choice of which selective reflector is active.

4 Claims, 10 Drawing Sheets

LIGHT

REVERSIBLE RING COUPLER FOR OPTICAL NETWORKS

FIELD OF THE INVENTION

The present invention relates to optical fiber based communication networks, and more particularly, to couplers for selectively transferring data between two such networks.

BACKGROUND OF THE INVENTION

Communication networks based on optical fibers for transferring data between terminals are attractive because of the high bandwidth of the optical fibers. Data is transmitted on these networks by modulating a light source, usually a laser. A plurality of users may share a single fiber either via time or wave division multiplexing (WDM). Wave division multiplexing is typically implemented by assigning a different wavelength to each user or channel.

A limited number of stations may be accommodated on any given fiber ring. Accordingly, a coupling device is used to selectively couple data from a first fiber to a second fiber. The data to be coupled is typically isolated to a sub-set of the channels on the first fiber. In some cases, it is advantageous to simultaneously remove the transferred channel from the first fiber after the channel is connected to the second fiber. Such coupling devices include optical circulators.

In a telecommunications network each subscriber communicates with a central office over a fiber that is arranged in a ring with the subscriber and central office stations disposed along the ring. If the fiber is broken, communication between one or more of the users and the central office will be interrupted. In principle, these users can still communicate with the central office by sending messages along the uninterrupted portion of the loop. However, this requires that the direction of propagation along the fiber be reversed over a portion of the fiber.

Unfortunately, the fiber ring typically includes components that are unidirectional in nature such as the optical circulators used to couple the fibers discussed above. To reverse the direction of propagation in response to a fiber break, duplicate optical circulators configured to propagate signals in the opposite direction are included in the network. These components are inserted into the fiber in place of the corresponding components by utilizing bypass switches. Such bypass arrangements substantially increase the cost and complexity of the optical network, and hence, it would be advantageous to avoid these bypass arrangements.

Broadly, it is the object of the present invention to provide an improved optical circulator.

It is another object of the present invention to provide an optical circulator whose direction of light transmission can be reversed by applying a control signal to the optical circulator without the need to utilize bypass switches and additional optical circulators.

It is yet another object of the present invention to provide an optical coupling arrangement in which the direction of propagation of the coupled signals may be switched without the need to utilize bypass switches and other circulators.

These and other objects of the present invention will become apparent to those skilled in the art from the following detailed description of the invention and the accompanying drawings.

SUMMARY OF THE INVENTION

The present invention is a reversible optical circulator and a coupling device constructed therefrom. The optical circulator has first, second, and third ports for receiving and transmitting light signals. A light separator resolves an incoming light signal on one of the ports into first and second light signals having orthogonal polarizations with respect to one another. A first non-reciprocal optical element that includes a first magnetic field generator for generating a first magnetic field operates on the first optical signal. The first magnetic field has a direction that is determined by a first control signal. The first non-reciprocal optical element rotates the polarization of the first optical signal by either 90 degrees or 0 degrees depending on the direction of the first magnetic field. A second non-reciprocal optical element that includes a second magnetic field generator for generating a second magnetic field operates on the second optical signal. The second magnetic field has a direction determined by a second control signal. The second non-reciprocal optical element rotates the polarization of the second optical signal by either 90 degrees or 0 degrees depending on the direction of the second magnetic field. A light collector combines the first and second optical signals after the first and second optical signals have traversed the first and second non-reciprocal optical elements, respectively, to create a combined light signal, the combined light signal leaving the optical circulator by another of the first and second ports. The non-reciprocal optical elements are preferably constructed from Faraday rotators and a half-wave plate.

The light coupling device adds a first light signal having a wavelength of $\lambda_1$ to a second light signal of wavelength $\lambda_2$ traveling in an optical channel. The coupling includes first and second optical channel ports, the second light signal entering one of the first and second optical channel ports and leaving by the other of the first and second optical channel ports and an optical channel input port for receiving the first light signal. The coupler includes an optical circulator and first and second reflectors. The optical circulator has first, second, and third ports and a circulation direction determined by the circulator input signal. Each of the reflectors has first and second ports, light entering one of the ports exits the other of the ports unless the light is reflected by the reflector. Each reflector has first and second reflection states, the reflector reflecting light of wavelength $\lambda_1$ in the first reflection state, and passing light of wavelength $\lambda$ in the second reflection state. The reflection state of the reflector is set in response to a reflector input signal associated with that reflector. Only one of the first and second reflectors is set to the second reflection state at any one time, the identity of the reflector in the second reflection state depending on the circulator input signal which also determines the direction of travel of the first light signal in the optical channel. The optical circulator preferably includes a Faraday rotator having a magnetic field direction that is determined by the circulator input signal. The reflectors are preferably constructed from variable wavelength fiber Bragg reflectors.

DETAILED DESCRIPTION OF THE INVENTION

The present invention provides its advantages by utilizing an optical circulator whose direction of propagation may be altered via a signal applied thereto. For the purposes of this discussion, an optical circulator will be defined to be any device having an ordered array of ports and a direction of circulation such that light entering any port of the optical circulator leaves the circulator by the next port encountered in the direction of circulation.

The present invention makes use of a Faraday rotator having a magnetic field whose direction is determined by the application of an external signal. A Faraday rotator is an element that is composed of an optically active compound such as yttrium-iron-garnet $Y_3Fe_5O_{12}$ which turns the direction of the polarization vector of the light passing therethrough by an angle of 45°. The direction of rotation is determined by the direction of an applied magnetic field. The direction of rotation of the polarization vector is independent of the direction of travel of the light through the element. By altering the direction of the magnetic field, the rotation of the polarization vector changes from 45° to −45° independent of the direction of travel of the light through the device.

Figure 1:
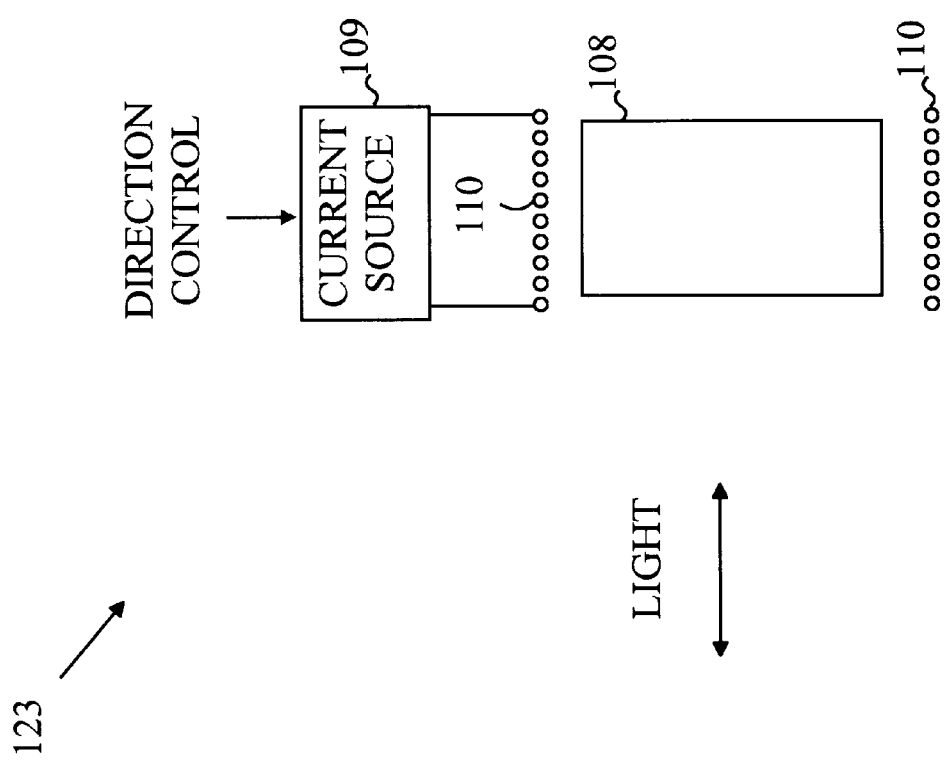
FIG. 1 is a schematic view of a Faraday rotator that rotates the polarization angle of the light that passes therethrough ±45° depending on the direction of the magnetic field.

Refer now to FIG. 1 which is a schematic view of a Faraday rotator 123 that rotates the polarization vector of the light that passes therethrough ±45° depending on the direction of the magnetic field. The direction of the magnetic field is determined by the current passing through coil 110, which generates a magnetic field having a component that is parallel to the direction of travel of the light. The current is provided by current source 109, which sets the direction of the current in response to a direction control signal. The direction control signal may be electrical or optical. Other embodiments in which the Faraday rotator utilizes a latching material may also be employed in the present invention. In such embodiments a current pulse sets the direction of magnetization. The direction remains the same until another current pulse is applied. Similarly, a permanent magnet together with a device for flipping the direction of the magnet in response to a control signal could also be utilized.

The present invention is based on non-reciprocal polarization rotators. Each such rotator is constructed from a Faraday rotator having a reversible magnetic field and a half-wave plate. The direction of rotation of the polarization vector provided by the Faraday rotator is the same regardless of the direction of travel of the light therethrough. The half-wave plate, in contrast, provides either a 45° or −45° rotation depending on the direction of travel of the light. As a result, in one direction the polarization vector is rotated through 90°, and in the other, it is rotated through 0°.

Figure 2:
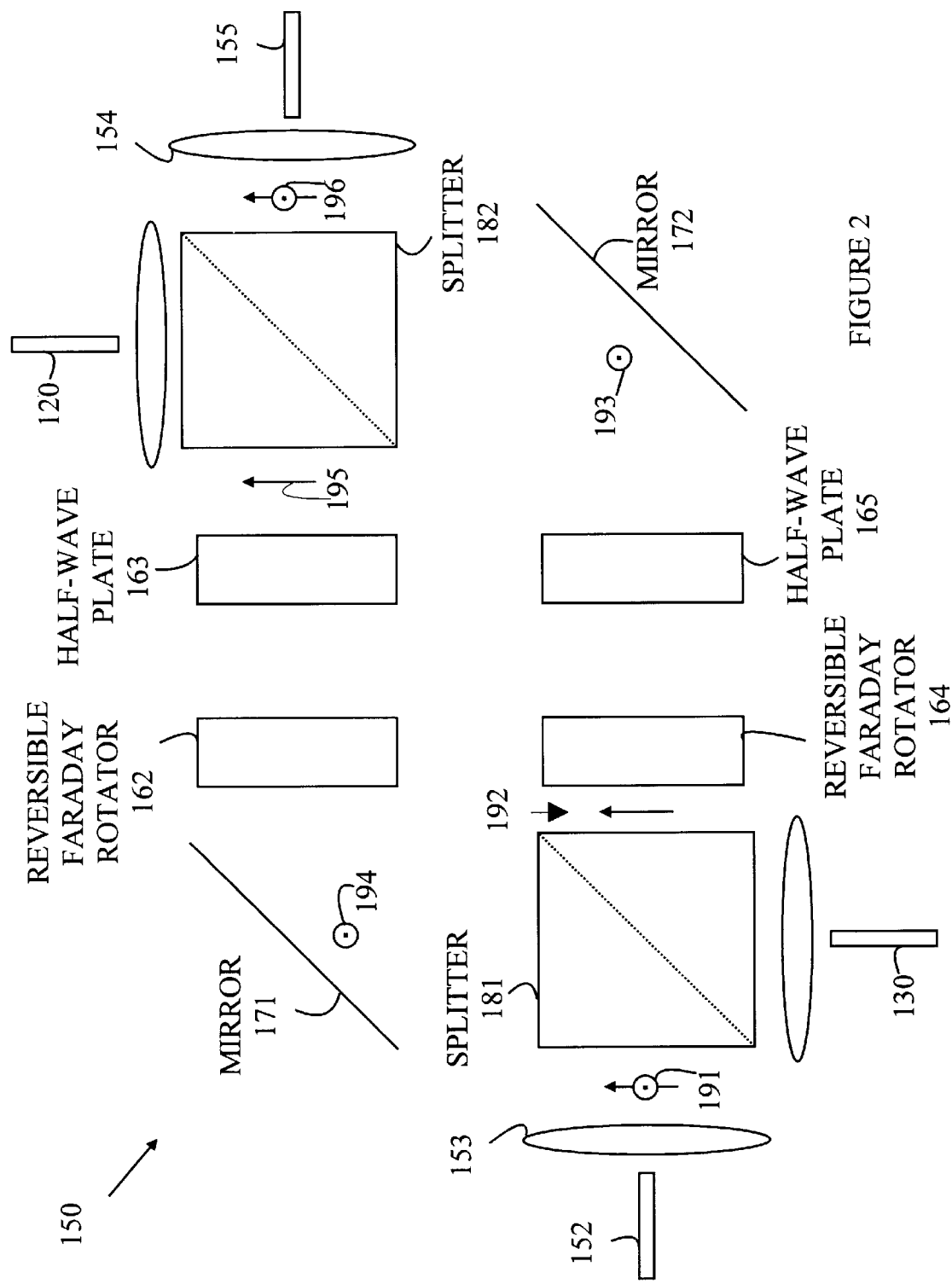
FIG. 2 is a schematic view of a reversible circulator according to the present invention.

Refer now to FIG. 2 which is a schematic view of a reversible circulator 150 according to the present invention. Circulator 150 utilizes two non-reciprocal polarization rotators.

Consider the case in which the reversible Faraday rotators 162 and 164 are set such that circulator 150 passes light from port 152 to port 155 which will be referred to as ports A and B. Light entering port 152 is collimated by lens 153. A polarization beam splitter 181 decomposes the polarization vector 191 of the incoming light into orthogonal components shown at 192 and 194. The polarization beam splitters are constructed from prisms that selectively reflect light of a predetermined polarization while passing light of the orthogonal polarization. The polarization component reflected by splitter 181 is reflected by mirror 171 into reversible Faraday rotator 162, which rotates the polarization by 45°. Half-wave plate 163 rotates the polarization vector by another 45° as shown at 195. This polarization passes through polarization splitter 182.

The component of the input light that passed through splitter 181 is shown at 192. This component is likewise rotated through a total of 90° by reversible Faraday rotator 164 and half-wave plate 165. The output of half-wave plate 165 is reflected into splitter 182 by mirror 172. This polarization is reflected by splitter 182 into lens 154 where it is combined with the output of half-wave plate 163 discussed above to reconstitute the input light as shown at 196. Hence, light entering port A leaves by port B.

Figure 3:
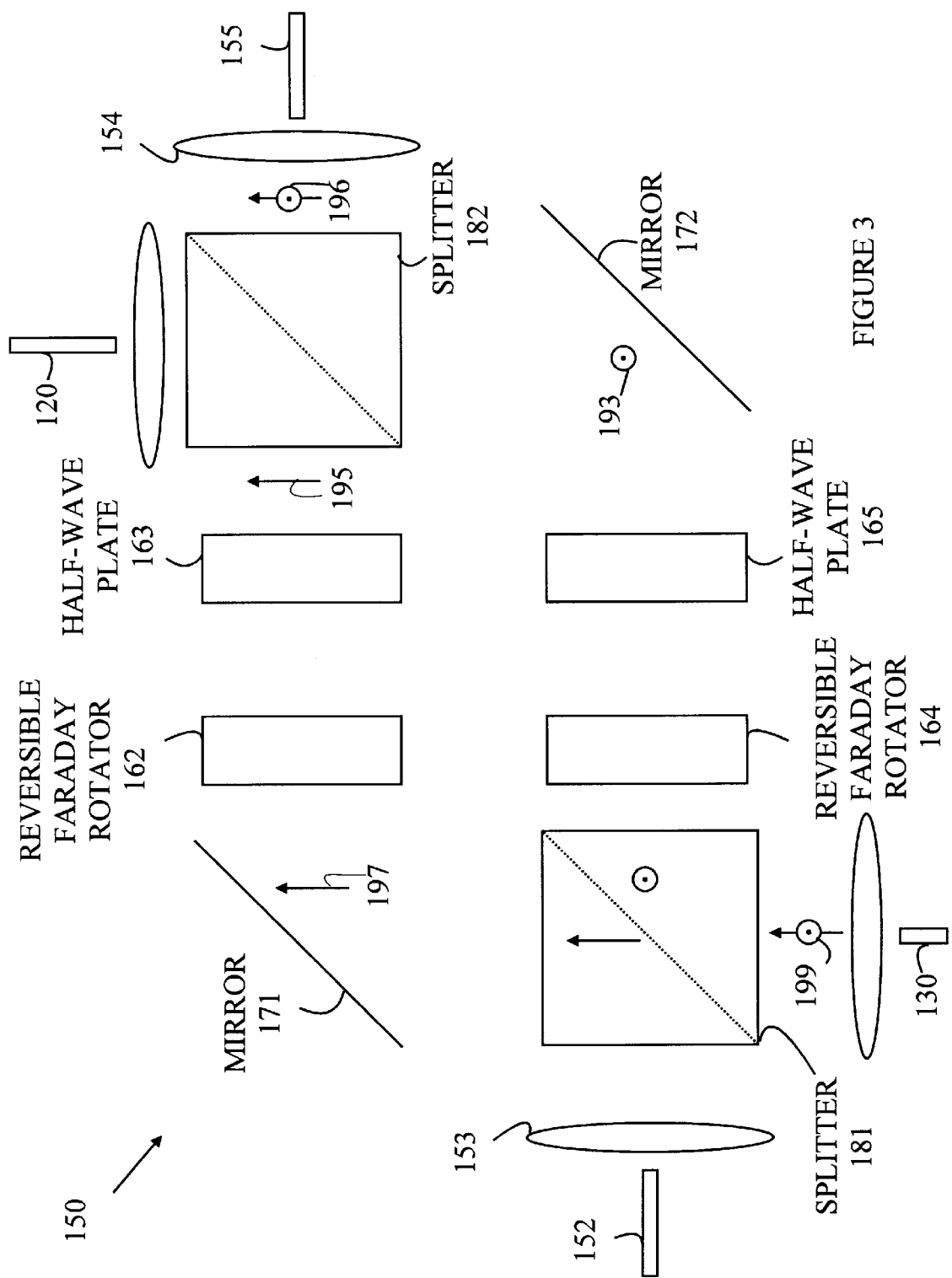
FIGS. 3 and 4 illustrate the manner in which light traverses the optical circulator shown in FIG. 2 depending on the port of entry of that light.

Refer now to FIG. 3, which illustrates the manner in which light entering port 155 is routed to port 130 which will be referred to as port C. The combination of half-wave plate 163 and Faraday rotator 162 leaves the polarization vector unchanged for this direction of travel. Hence, the component of the polarization that is passed by splitter 182 leaves reversible Faraday rotator 162 with the same polarization as shown at 197. This component is reflected by mirror 171 into splitter 181 and passes through splitter 181. The component of the input light reflected by splitter 182 and mirror 172 passes unchanged through half-wave plate 165 and reversible Faraday rotator 164 since Faraday rotator 164 reverses the 45° rotation introduced by half-wave plate 165. This component is reflected by splitter 181 and is recombined with component 197. The reconstituted light then leaves via the bottom of splitter 181 as shown at 199, and enters port 130. A similar analysis can be applied to show that light entering port 130 leaves via port 120, referred to as port D. Accordingly, the direction of circulation for the orientation of the magnetic fields shown in FIGS. 1 and 2 is A-B-C-D.

Figure 4:
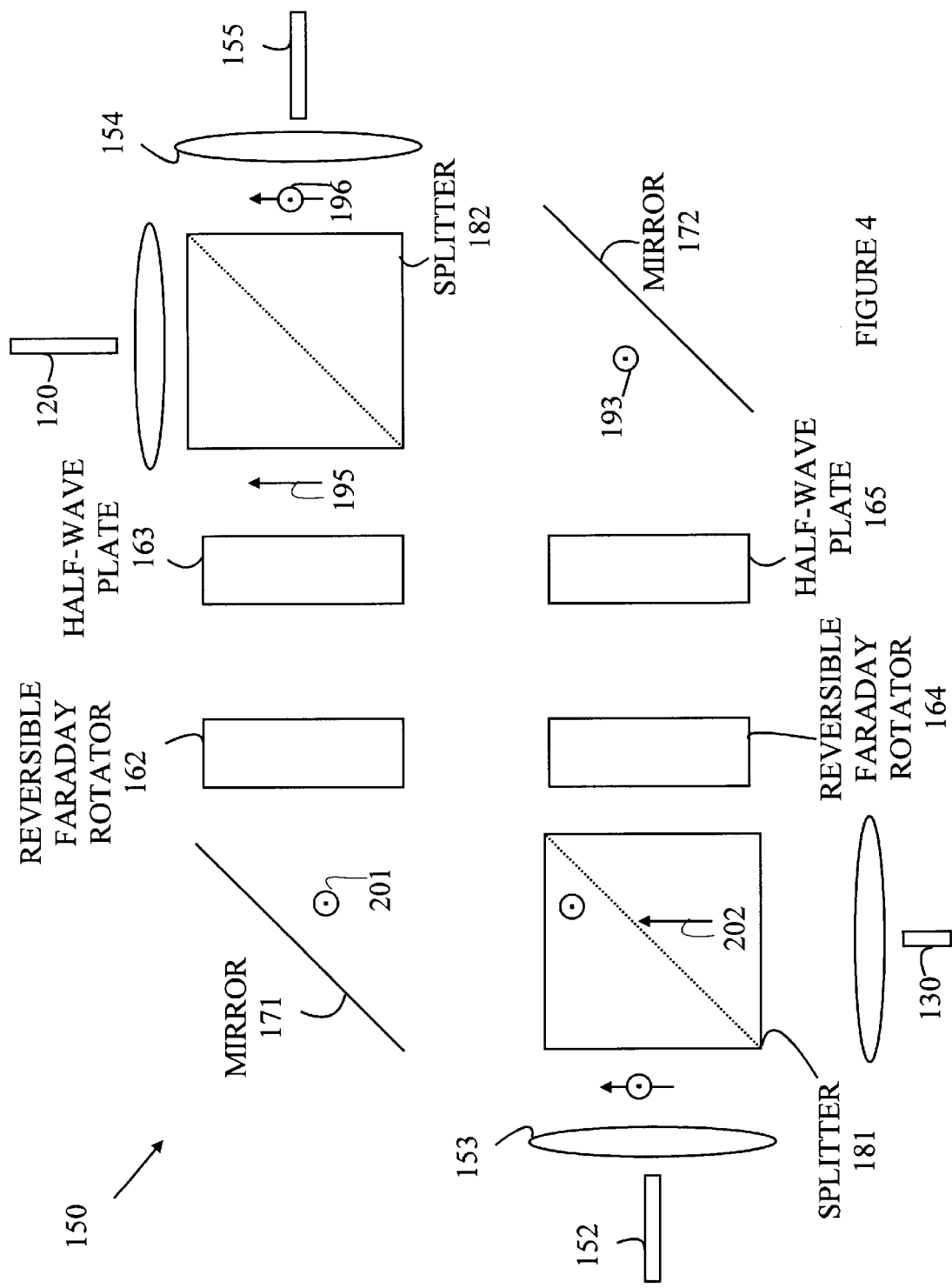

Now consider the case in which the magnetic fields in the two Faraday rotators are reversed. Referring to FIG. 4, light entering port 155 is once again decomposed into the orthogonal components shown at 195 and 193. However, component 195 is now rotated through 90° by the combination of half-wave plate 163 and Faraday rotator 201. Similarly, component 193 is rotated through 90° by half-wave plate 165 and Faraday rotator 164 as shown at 202. Component 201 is reflected by mirror 171 and beam splitter 181 while component 202 passes through beam splitter 181. Hence, the two components are combined and exit via port 152. That is, light entering port B now exits via port A. A similar analysis can be used to confirm that light entering port C now exits through port B, and light entering port D now exits through port C. That is, the direction of circulation is now D-C-B-A. Accordingly, reversing the magnetic fields in the Faraday rotators reverses the direction of circulation.

A reversible coupler according to the present invention utilizes a reversible circulator as described above in combination with a number of variable wavelength fiber Bragg reflectors (VFBRs). Since fiber Bragg reflectors are well known to the art, they will not be discussed in detail here. For the purpose of the present discussion, it is sufficient to note that a Bragg reflector may be viewed as a grating that has been induced in the core of an optical fiber. The grating consists of periodic alterations in the index of refraction of the core of the fiber. Such alterations may be induced by illuminating the core with a UV light pattern having regularly spaced maxima of sufficient intensity to damage the core. The pattern is typically generated by the interference of two UV light beams.

When light having a wavelength twice the spacing of the grating strikes the grating, the light is reflected because of the coherent interference of the various partial reflections created by the alterations in the index of refraction of the fiber core. The wavelength at which the reflection occurs may be varied by varying the optical path length between the periodic alterations in the index of refraction. This may be accomplished by heating the fiber or by stretching the fiber. The input signal used to activate the heating or stretching system is not shown in the figures to simplify the figures; however, it is to be understood that each VFBR includes a signal input and the appropriate hardware for altering the reflection wavelength.

In a typical wavelength division multiplexed (WDM) optical network, the channels have closely spaced wavelengths. The spacing between any two channels is sufficient to provide channel isolation. However, the total wavelength range across all of the channels is preferably kept to a minimum to allow a single optical amplifier to be used to maintain the signal strength in the network at each amplification station.

In general, the degree of variation in the reflection wavelength of the VFBR is sufficient to move the reflection wavelength from a value between two channels to a value on one of the adjacent channels. Hence, the light in a single channel can be selectively reflected by heating or stretching a corresponding VFBR to move its reflection wavelength from a value between two channels to the channel value. When the wavelength is set between the two channels, no reflections occur, since there is no light at that wavelength.

Figure 5:
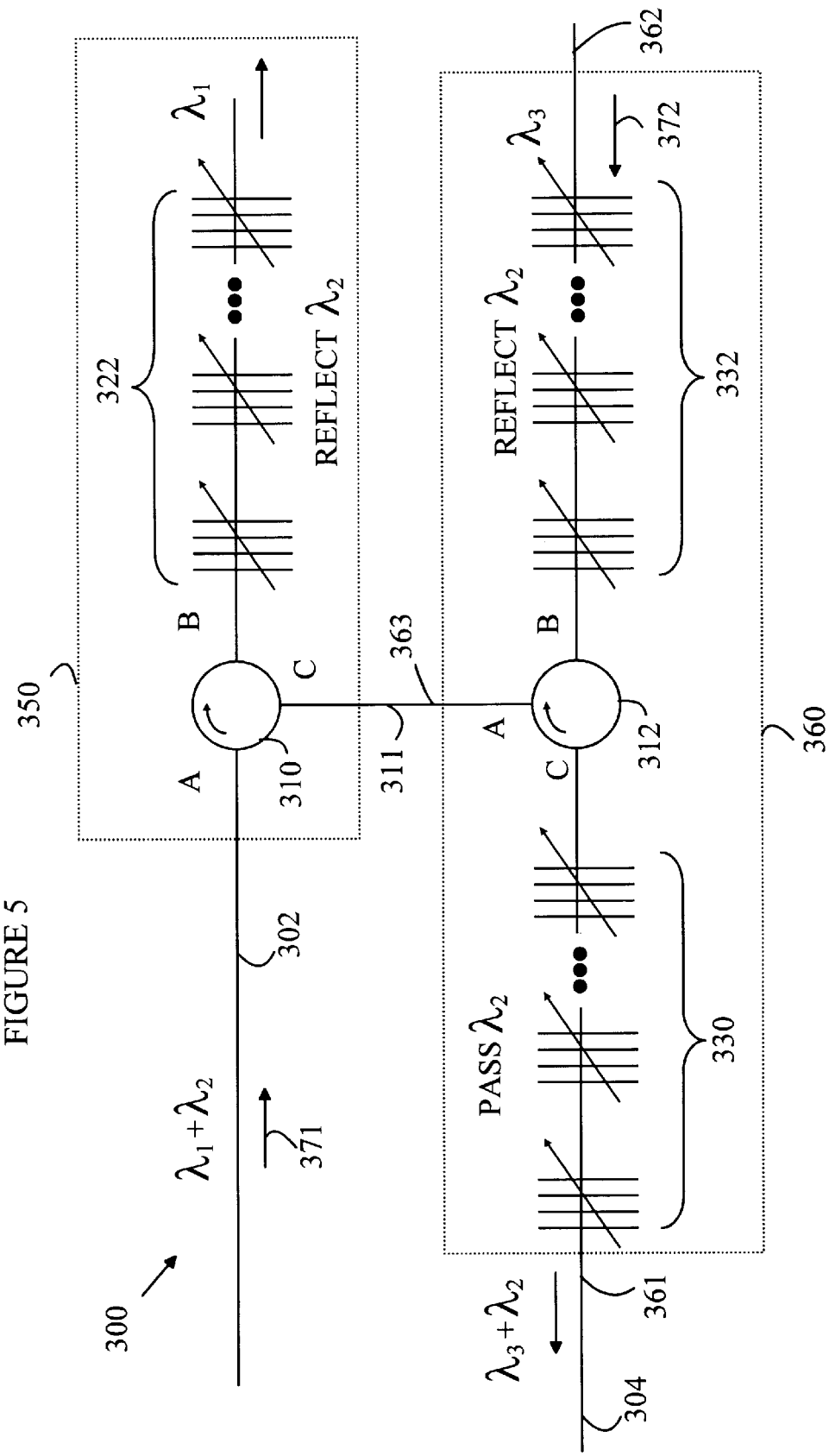
FIG. 5 is a block diagram of a cross-coupler according to the present invention.

The manner in which a coupler according to the present invention operates may be more easily understood with reference to FIG. 5. FIG. 5 is a block diagram of a cross-coupler 300 according to the present invention. Cross-coupler 300 transfers signals from a first optical network operating on an optical channel 302 to a second optical network operating on an optical channel 304. For simplicity, it will be assumed that optical channels 302 and 304 are optical fibers; however, it will be apparent to those skilled in the art that other forms of optical transmission may be utilized. For the purpose of the present discussion, it will be assumed that light signals transmitted on wavelengths $\lambda_1$ and $\lambda_2$ enter cross-coupler 300 on optical channel 302. The signals transmitted on $\lambda_2$ are to be transferred to optical channel 304 and eliminated from optical channel 302. It will also be assumed for the purposes of this example that optical channel 304 currently has signals transmitted on $\lambda_3$ which is different from $\lambda_2$.

Cross-coupler 300 may be viewed as being constructed from a first interface 350 that is inserted into optical channel 302 and a second interface 360 that is inserted into optical channel 304. Interface 350 includes an optical circulator 310 and a reflector 322 comprising one or more VFBRs. There is one VFBR corresponding to each channel wavelength that is to be switchable between optical channels 302 and 304. Light that is not reflected by one of the VFBRs 322 is injected back into optical channel 302.

Interface 360 has first and second ports that receive and transmit the light signals travelling in optical channel 304 as shown at 361 and 362. A third port 363 receives the signals that are to be added to the signals currently traversing optical channel 304.

To simplify the following discussion, it will be assumed that optical channel 302 has light of wavelengths $\lambda_1$ and $\lambda_2$. The light at wavelength $\lambda_2$ is to be switched to optical channel 304 which is currently occupied by light at $\lambda_3$. The direction of travel of light in optical channels 302 and 304 is indicated by the arrows at 371 and 372, respectively.

To switch the light at $\lambda_2$ from optical channel 302 to optical channel 304, one of the VFBRs in reflector 322 is tuned to reflect light of this wavelength. The remaining VFBRs are set to frequencies between the wavelengths that are present in the system, and hence, light of wavelength $\lambda_1$ is passed by reflector 322 and remains in optical channel 302. The light at wavelength of $\lambda_2$ is reflected back into port B of circulator 310, where it exits through port C on an optical connecting channel 311.

The control of reflector 322 is provided by a signal to a device included in the reflector which shifts the reflection wavelength of one of the VFBRs from a "parked wavelength" that does not match either $\lambda_1$ or $\lambda_2$ to $\lambda_2$. For the purposes of this discussion, a "parked wavelength" is defined to be a wavelength at which no signal is present or a wavelength at which the VFBR does not interact with the light. When optical channel 302 is configured to allow light of both $\lambda_1$ and $\lambda_2$ to pass, reflector 322 is adjusted such that all of the VFBRs are set to parked wavelengths. Since no light is present at the parked wavelengths, reflector 322 does not alter the operation of the network on optical channel 302 in this configuration.

The light present on connecting channel 311 is integrated into the signals on optical channel 304 in an analogous manner by interface 360. Light on connecting channel 311 enters port A of optical circulator 312 and exits through port B of that circulator. Optical circulator 312 must have a minimum of three ports; however, an optical circulator having more ports such as the 4-ported circulator described above may be utilized. In such cases only the first three ports are actually used. A second reflector 332 comprising a plurality of VFBRs is set to selectively reflect the light of $\lambda_2$ by adjusting the reflection wavelength of one of the VFBRs in the reflector. Hence, the light of $\lambda_2$ leaving port B is reflected back to port B of circulator 12 and exits via port C onto optical channel 304. Since reflector 332 reflects only light of $\lambda_2$, the light at $\lambda_3$ that is already traveling through optical channel 304 is not altered. This light also enters circulator 312 and exits back onto optical channel 304. A third reflector 330 is set to pass all wavelengths in this configuration.

Figure 6:
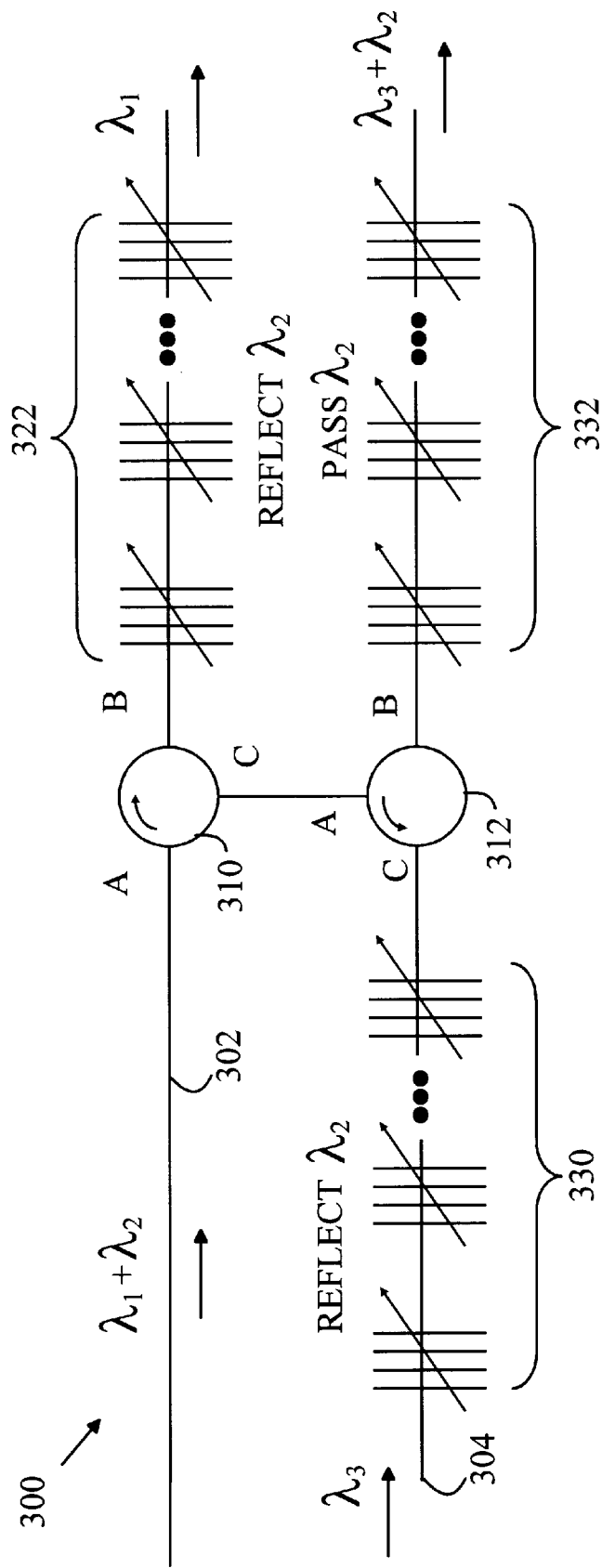
FIG. 6 is a schematic view of the cross-coupler shown in FIG. 5 in a configuration for coupling light into the optical channel in the opposite direction to that shown in FIG. 5.

Now consider the case in which the direction of travel in optical channel 304 is to be reversed as shown in FIG. 6. FIG. 6 is a schematic view of cross-coupler 300 in a configuration for coupling light into optical channel 304 in the reverse direction to that shown in FIG. 5. Circulator 312 is a reversible optical circulator of the type discussed above. To reverse the direction of injection of light of wavelength $\lambda_2$, the direction of circulation in circulator 312 is reversed by reversing the direction of the magnetic fields in the Faraday rotators contained in circulator 312. In addition, reflector 330 is now tuned to reflect light of $\lambda_2$, and reflector 332 is tuned to pass light having a wavelength of either $\lambda_2$ or $\lambda_3$. When light of $\lambda_2$ enters circulator 312, the light will now exit port C where it is reflected by reflector 330 back into port C. The light entering port C of circulator 312 exits via port B and passes through reflector 332.

The above-described embodiment of a reversible circulator according to the present invention discussed with reference to FIGS. 2–4 utilized a particular 4-port circulator design having two Faraday rotators. However, the observation that reversing the direction of the magnetic fields of the Faraday rotators in the circulator can reverse the direction of circulation of a circulator is true of other circulator designs that utilize Faraday rotators. Refer now to FIGS. 7–10, which are block diagrams of a 3-port circulator 400 according to the present invention. To simplify the drawing, the various imaging lenses have been omitted. Circulator 400 is constructed from a polarization beam splitter (PBS) 401, a reversible Faraday rotator 402, and a walk-off crystal (WOC) 403.

Figure 7:
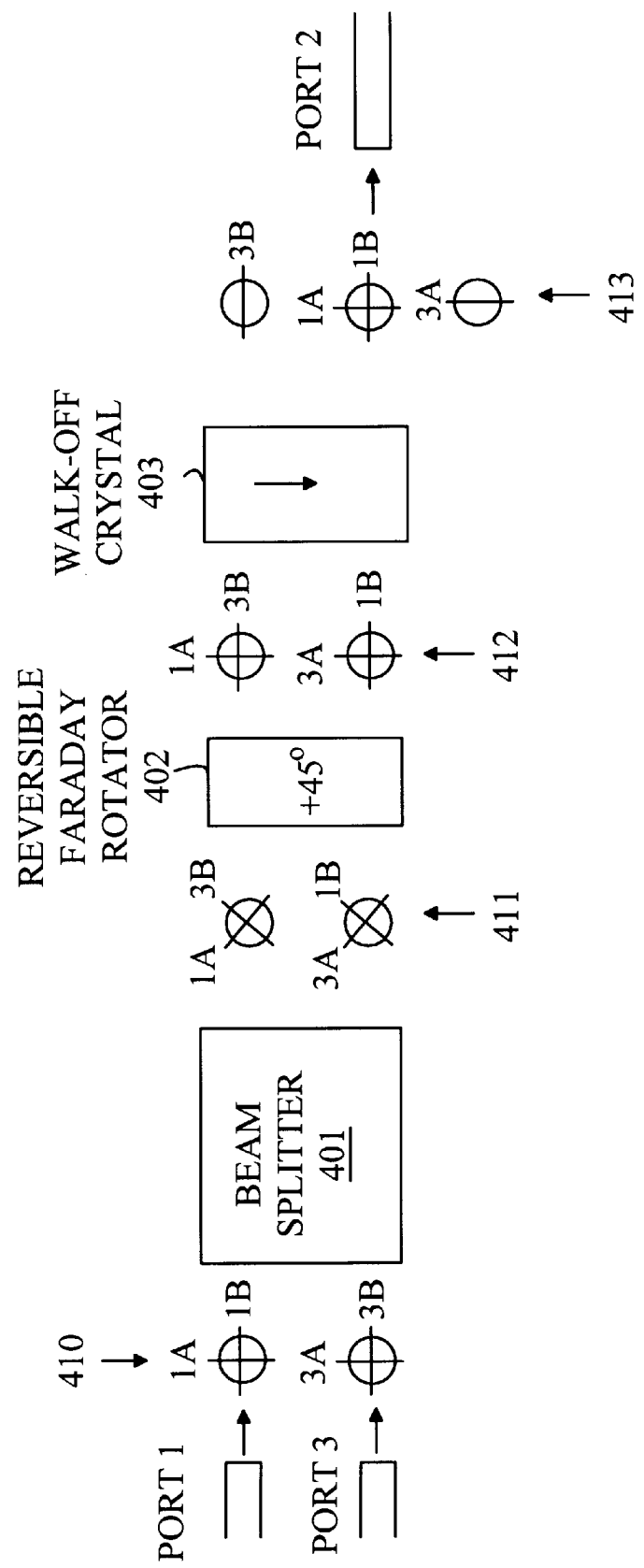
FIGS. 7–10 are block diagrams of a 3-port circulator according to the present invention.

The light entering and exiting the ports of circulator 400 is most conveniently viewed as being composed of two orthogonal polarizations. Referring to FIG. 7, the light entering port 1 is composed of polarization components 1A and 1B. Similarly, light entering port 3 is composed of polarization components 3A and 3B as shown at 410. PBS 401 causes the polarization vectors of the light to be rotated by 45° and also causes one of the components to be displaced as shown at 411. PBS 401 can be constructed from a Rutile crystal as taught in U.S. Pat. No. 5,734,763 which is hereby incorporated by reference. Faraday rotator 402 is set so as to rotate all of the polarization vectors through 45°. Hence, the light beams are rotated such that the polarization vectors are as shown at 412. WOC 403 causes the vertical polarization components, i.e., 1A and 3A, to be displaced in the direction of the arrow shown in WOC 403. The walk-off distance is determined by the thickness of the crystal and chosen such that component 1A is displaced to the location of component 1B as shown at 413. Port 2 is positioned to collect light from this position. Hence, light entering port 1 exits through port 2, and light entering port 3 is lost.

Figure 8:
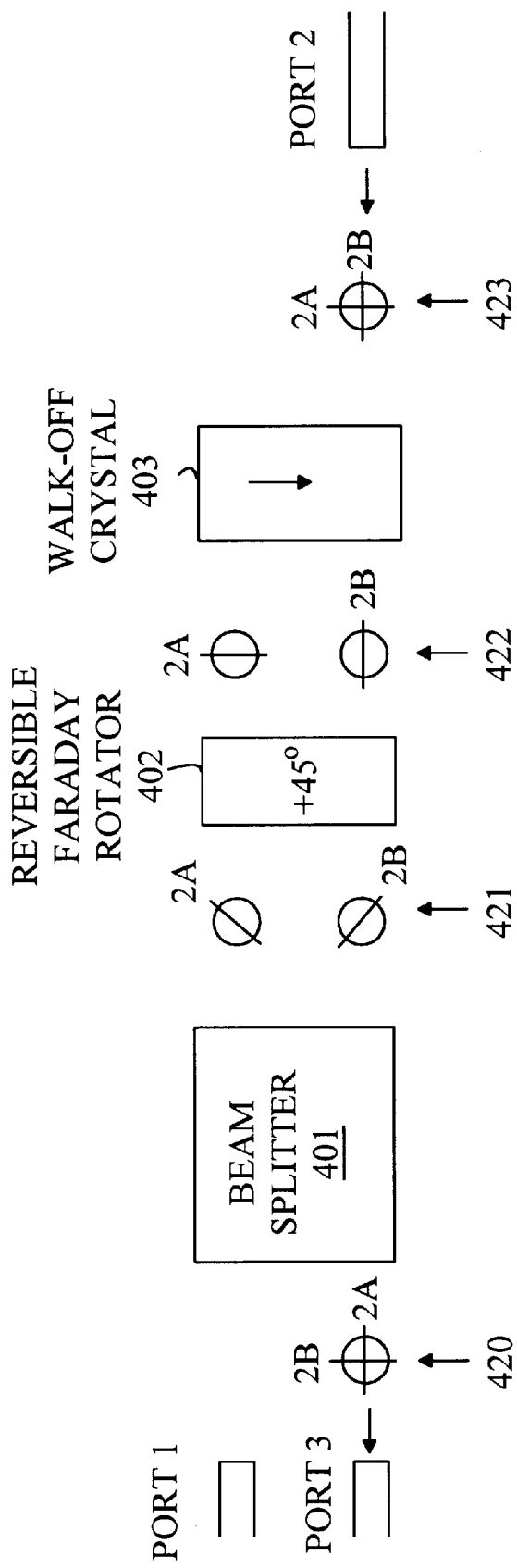

Referring to FIG. 8, it can be seen that light entering port 2 exits through port 3 when Faraday rotator 402 is set to provide 45° of rotation. The light entering port 2 is composed of polarization components 2A and 2B as shown at 423. WOC 403 decomposes the light into two polarized beams as shown at 422. These beams are rotated through 45° by Faraday rotator 402 as shown at 421. The polarizations of these beams are rotated by PBS 401 and displaced to the location of port 3 as shown at 420.

Figure 9:
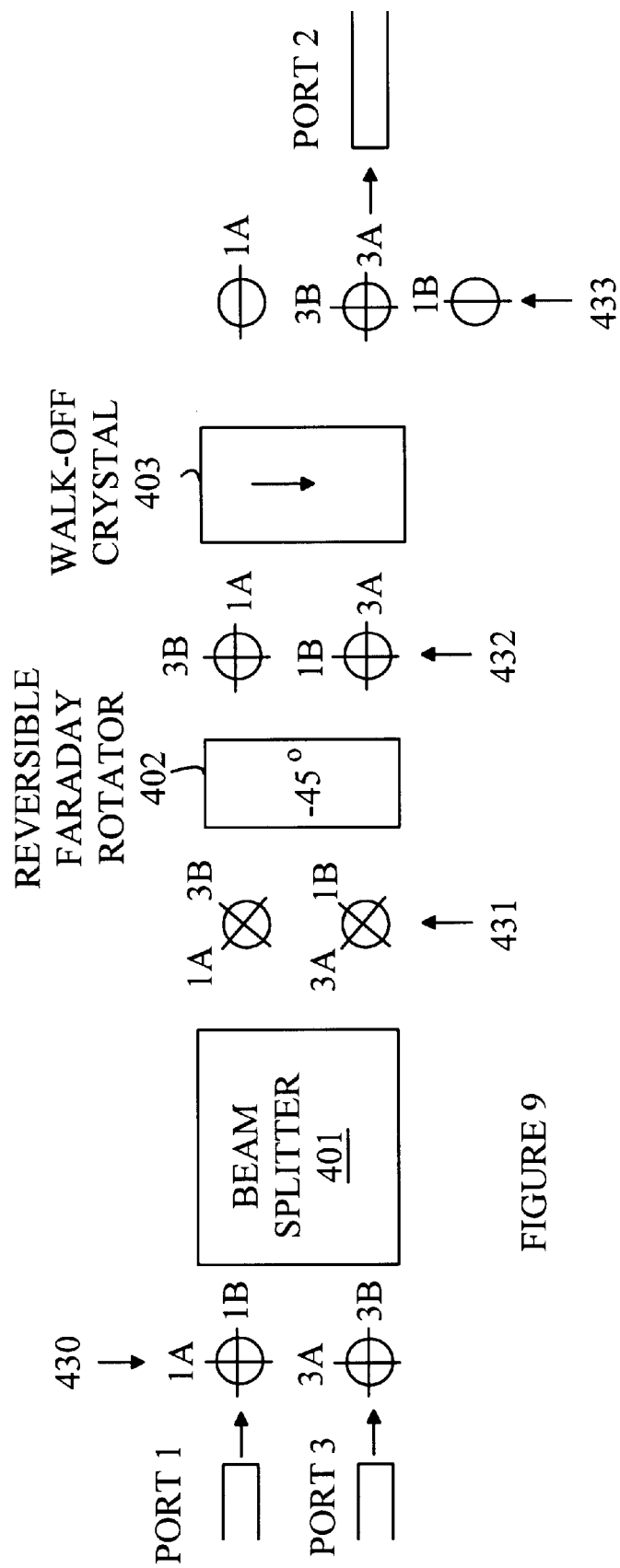

Now consider the case in which the magnetic field in Faraday rotator 402 is set to provide a rotation of −45°. Refer first to FIG. 9, which illustrates the paths traversed by light entering ports 1 and 3. Once again, the entering light is assumed to consist of two orthogonal linear polarizations. PBS 401 rotates the polarizations and mixes the polarizations as shown at 431. The polarizations are then rotated through −45° by Faraday rotator 402 as shown at 432. It should be noted that components 3A and 3B are now rotated by 90° from their positions in FIG. 7. Hence, WOC 403 recombines 3A and 3B at the location of port 2 and the components from port 1 are lost. That is, port 3 is now routed to port 2.

Figure 10:
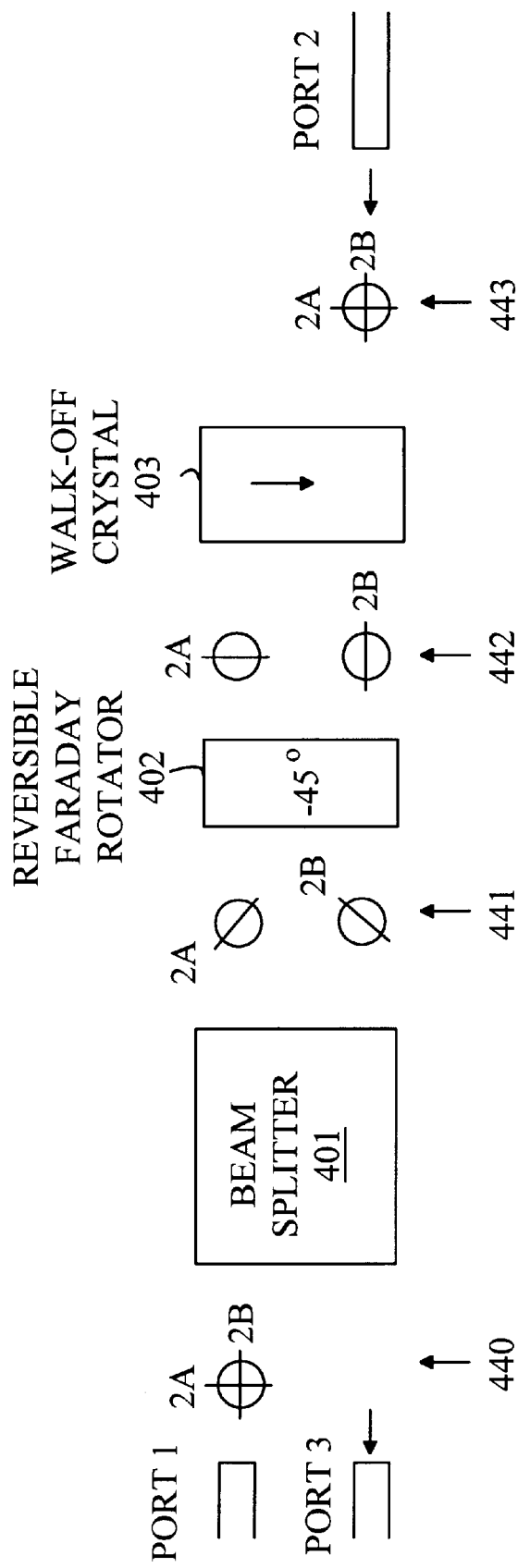

Referring to FIG. 10, it can be seen that light entering port 2 now exits through port 1. Once again, WOC 403 decomposes the input light shown at 443 into two polarized beams shown at 442. The polarization directions of these beams are rotated through −45° by Faraday rotator 402, as shown at 441. PBS 401 then recombines these beams at the location of port 1 as shown in 440.

Various modifications to the present invention will become apparent to those skilled in the art from the foregoing description and accompanying drawings. Accordingly, the present invention is to be limited solely by the scope of the following claims.

What is claimed is:

1. A light coupling device for adding a first light signal having a wavelength of $\lambda_1$ to a second light signal of wavelength $\lambda_2$ traveling in an optical channel, said coupling comprising:

a first optical channel port and a second optical channel port, said second light signal entering one of said first and second optical channel ports and leaving by the other of said first and second optical channel ports;

an optical channel input port for receiving said first light signal;

an optical circulator having first, second, and third ports and a circulation direction determined by a circulator input signal thereto; and a first reflector having first and second ports, light entering one of said ports exiting the other of said ports unless said light is reflected by said first reflector, in which case said reflected light leaves by the port through which said light entered, said first reflector having first and second reflection states, wherein said first reflector reflects light of wavelength $\lambda_1$ in said first reflection state and said first reflector is transparent to light of wavelength $\lambda_1$ in said second reflection state, said reflection state of said first reflector being set in response to a first reflector input signal, wherein said first port of said first reflector is connected to said first optical channel port, said first port of said optical circulator is connected to said optical input port, said second port of said first reflector is connected to said second port of said optical circulator.

2. The light coupling device of claim 1 further comprising:

a second reflector having first and second ports, light entering one of said ports exiting the other of said ports unless said light is reflected by said second reflector, in which case said reflected light leaves by the port through which said light entered, said second reflector having first and second reflection states, wherein said second reflector reflects light of wavelength $\lambda_1$ in said first reflection state and said second reflector is transparent to light of wavelength $\lambda_2$ in said second reflection state, said reflection state of said second reflector being set in response to a second reflector input signal, said first and second reflectors being transparent to light of wavelength $\lambda_2$, wherein said second port of said second reflector is connected to said second optical port, said third port of said optical circulator is connected to said first port of said second reflector, and wherein only one of said first and second reflectors is set to said second reflection state at any one time, the identity of said reflector in said second reflection state depending on said circulator input signal.

3. The coupling device of claim 1 wherein said optical circulator comprises a Faraday rotator having a magnetic field direction that is determined by said circulator input signal.

4. The coupling device of claim 2 wherein said first and second reflectors comprise variable wavelength fiber Bragg reflectors.

* * * * *